S. B. HARNER.
TEAT CUP.
APPLICATION FILED NOV. 10, 1916.

1,256,792.

Patented Feb. 19, 1918.

Inventor
Samuel B. Harner,
By Edward␣␣Reed
Attorney.

UNITED STATES PATENT OFFICE.

SAMUEL B. HARNER, OF NEAR XENIA, OHIO.

TEAT-CUP.

1,256,792.    Specification of Letters Patent.    Patented Feb. 19, 1918.

Application filed November 10, 1916. Serial No. 130,514.

*To all whom it may concern:*

Be it known that I, SAMUEL B. HARNER, a citizen of the United States, residing near Xenia, in the county of Greene and State of Ohio, have invented certain new and useful Improvements in Teat-Cups, of which the following is a specification, reference being had therein to the accompanying drawing.

This invention relates to teat cups for milking machines, and the object of the invention is to provide a teat cup in which the pressure on the teat will be distributed over substantially the entire surface thereof, and in which the suction will not draw the blood into the end of the teat or cause it to be pinched.

To this end it is a further object of the invention to provide a teat cup having a flexible inner casing to receive the teat and to which the pressure is applied, and to provide means for spacing this flexible casing away from the outer wall or casing of the cup, and to hold the casing in its extended condition when the cup is removed from the teat.

In the accompanying drawings Figure 1 is a sectional view of a teat cup embodying my invention;

Figure 1:
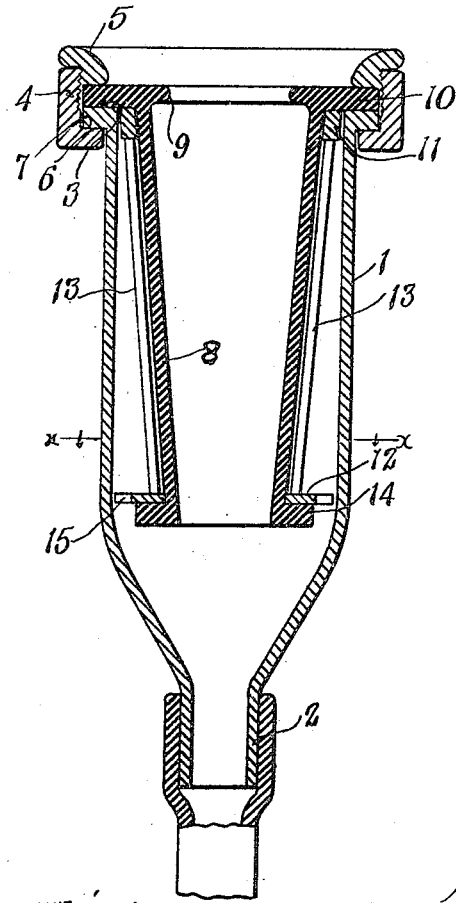

In these drawings I have illustrated one embodiment of my invention and have shown the same as comprising an outer casing 1, preferably of metal, and which may be of any suitable shape and construction. As here shown the outer casing comprises a substantially cylindrical body having its lower portion tapered downwardly and merging into a nipple 2 adapted to receive a flexible conduit by means of which the teat cup is connected with the suction apparatus and the milk pail. At its upper end this outer casing is provided with a shoulder 3 above which extends a screw-threaded flange 4 adapted to receive a clamping collar 5. Preferably the flange is formed separately from the body of the casing and is connected thereto by means of an annular shoulder 6 coöperating with a similar shoulder 7 at the upper end of the casing, after the manner of the ordinary pipe coupling.

As shown the collar is flared outwardly to engage the udder where the latter merges into the teat. Mounted within the outer casing is a compressible inner casing 8, which is preferably tapered downwardly and is provided at its lower end with an opening. This compressible casing is adapted to receive the teat and has at its upper end an inwardly extending flange, or apertured diaphragm, 9 to engage the teat, and has a flange 10 extending outwardly between the shoulder 3 and the clamping collar 5. The outer wall of the inner casing is spaced away from the inner wall of the outer casing to form an air space which communicates with the opening in the outer casing leading to the nipple 2. The inner casing may be constructed in different ways and may be secured to the outer casing in any suitable manner. In that form of the device here shown the inner casing is formed of a flexible material, such as soft rubber, and has formed integral therewith at its upper end an outwardly extending annular flange 10 adapted to be clamped between the shoulder 3 and the clamping collar 5, thereby causing the inner casing to be suspended within the outer casing with its lower end spaced away from the opening in the outer casing. In this construction the inwardly extending flange, or apertured diaphragm, is also formed integral with the body of the casing.

Figure 2:
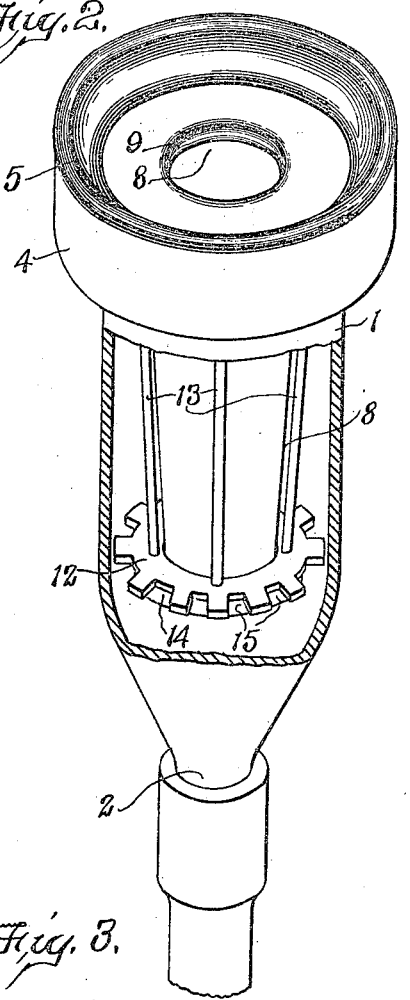
Fig. 2 is a perspective view of the same with the outer casing partly broken away.
Figure 3:
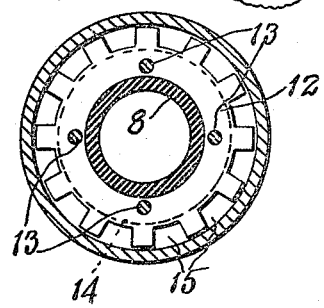
Fig. 3 is a sectional view taken on the line $x$—$x$ of Fig. 1 and looking in the direction of the arrows.

Suitable means are provided for spacing the inner casing from the wall of the outer casing to form an air space between the two casings, and means also are provided for holding the inner casing in its extended position when the teat cup is being removed from the teat, thus preventing the flexible inner casing from adhering to the teat and being turned wrong side out when the teat is removed. Preferably the two functions are performed by a single device, and in that form of the invention shown in Figs. 1, 2 and 3 I have utilized a supporting structure, or cage, for the inner casing. As here shown this cage comprises two rings, 11 and 12, of different diameters and connected one to the other by rods 13, and the cage is so arranged as to maintain the desired space between the walls of the two casings. The rings 11 and 12 may be of any suitable character, but as here shown they are both flat and the upper ring 11 is shown parallel with the inner casing, but it may, if desired, extend beneath the clamping collar 5. In order that the supporting structure, or cage, may also serve to retain the inner casing in its extended position, the latter is provided at its lower end with an outwardly extending flange 14 against which bears the lower ring 12 of the cage. The cage is of such a length that the upper and lower rings will fit between the two flanges and thus hold the casing in its extended position. Because of the flexible character of the casing and its flanges it will be apparent that in applying the cage to the casing the lower flange can be compressed or folded in such a manner as to enable it to be passed through the lower ring of the cage. It will also be apparent that the construction is such that the casing and the cage are both suspended from the top of the outer casing by means of the upper flange 10, without extending the upper ring 11 of the cage beneath the clamping collar. In order to maintain the lower end of the casing in its spaced relation to the outer casing without interrupting the communication between the air space and the conduit, which leads from the lower end of the outer casing, openings are formed through the ring of the cage, or through both the ring and the flange. Preferably, however the ring is made of a greater width than the flange so that it will extend beyond the outer edge thereof, and this outer portion of the ring is provided with notches, or openings 15, which permit of a free circulation of the air.

Figure 4:
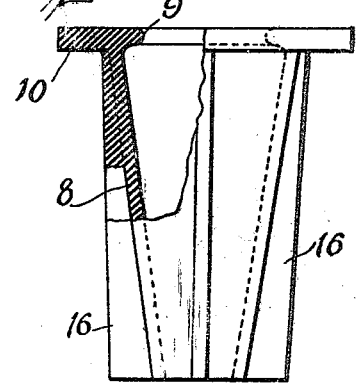
Fig. 4 is a detail view of a modified form of inner casing.

As has been stated various means may be employed for spacing the inner casing from the outer casing and holding the former in its extended condition, and in Fig. 4 I have shown the inner casing as having longitudinal ribs 16 formed integral therewith and serving both as spacing members and to hold the inner casing extended. Otherwise the construction of the inner casing is substantially similar to that of the casing 8, except that it is not provided with a flange at its lower end.

In the operation of the device the teat cup is applied to the teat in the usual manner and the suction therein will act on all portions of the outer surface of the inner casing 8. The pressure being equally distributed throughout the teat there is little or no tendency to pinch the same, or to draw blood into the lower end thereof. The teat may extend clear to the lower end of the inner casing and, if it does, this opening will be closed by the teat, the opening in the latter registering with the opening in the casing. If the teat is shorter than the inner casing it will nevertheless fit within the same in such a manner that the air will not act directly upon the teat, except at the point thereof.

While I have shown and described one embodiment of my invention I wish it to be understood that I do not desire to be limited to the details thereof as various modifications will occur to a person skilled in the art.

Having now fully described my invention, what I claim as new and desire to secure by Letters Patent is:—

1. In a teat cup, an outer casing having an opening to connect it with an air conduit, an inner casing of flexible material supported within said outer casing, rings encircling said inner casing near the upper and lower ends thereof, and members connected with said rings and extending lengthwise of said inner casing, said members being spaced apart to expose relatively large portions of the inner casing to the action of the air in said outer casing.

2. In a teat cup, an outer casing having a cylindrical portion and having an opening at one end thereof to connect the same with an air conduit, an inner casing of flexible material supported within said cylindrical portion of said outer casing and tapered toward the opening therein, rings of different diameters encircling said inner casing near the upper and lower ends thereof, and members connected with said rings, extending lengthwise thereof and spaced apart to expose relatively large portions of said flexible inner casing to the action of the air in said outer casing.

3. In a teat cup, an outer casing having an opening to connect it with an air conduit, an inner casing of flexible material supported in said outer casing, and a cage interposed between said inner casing and said outer casing to space the inner casing from said outer casing and comprising a pair of rings encircling said inner casing, spaced apart and connected one to the other by rods extending lengthwise of said inner casing.

4. A teat cup comprising an outer casing having an opening to connect the same with an air conduit, an inner casing of flexible material, and means carried by said inner casing to space the same from said outer casing and to hold it in its extended position, said means being so arranged as to expose relatively large circumferential portions of said flexible inner casing to the action of the air in said outer casing.

5. A teat cup comprising an outer casing having an opening to connect the same with a conduit, an inner casing of flexible material, and a device carried by said inner casing to hold the same in its extended position.

6. A teat cup comprising an outer casing having an opening to connect the same with a conduit, an inner casing of flexible material, and a device carried by said inner casing to space the same from said outer casing and to hold it in its extended position.

7. A teat cup comprising an outer casing having an opening to connect the same with a conduit, an inner casing of flexible material having flanges at its upper and lower ends, and a device mounted on said inner casing between said flanges to space the same away from the outer casing and to hold it in its extended position.

8. A teat cup comprising an outer casing having an opening to connect the same with a conduit, an inner casing of flexible material, and a spacing device interposed between said inner casing and said outer casing, said device having means at its lower end to engage said outer casing and said inner casing and hold the latter against lateral displacement.

9. A teat cup comprising an outer casing having an opening to connect the same with a conduit, an inner casing of flexible material having a projection at its lower end, and a spacing device mounted on said inner casing and engaging said projection to hold said inner casing in its extended position.

10. A teat cup comprising an outer casing having an opening to connect the same with a conduit, an inner casing of flexible material having flanges at its upper and lower ends, a spacing device carried by said inner casing and comprising rings extending about the same adjacent to the respective flanges and rods connecting said rings one with the other.

11. A teat cup, comprising an outer casing having an opening at its lower end, an inner casing of flexible material having a flange at its lower end, and a spacing device comprising a ring extended about the lower part of said inner casing, having its outer edge projecting beyond said flange and having said outer edge provided with openings.

12. A teat cup comprising an outer casing having an opening at its lower end, an inner casing of flexible material having laterally extending flanges at its opposite ends, a spacing device comprising rings extending about said inner casing, and connecting members to connect said rings one to the other, the upper ring being of a width less than the width of the upper flange of said inner casing and the lower ring being of a width greater than the lower flange of said inner casing and having openings therein, said rings being arranged to engage the respective flanges, whereby said device is carried by said inner casing and serves to retain the same in its proper position.

13. A teat cup comprising an outer casing having an opening at its lower end and a shoulder at its upper end, and also having a screw-threaded flange extending beyond said shoulder, an inner casing of flexible material having a flange extending inwardly to engage the teat and also having a flange extending outwardly to engage the shoulder on said outer casing, a collar adapted to be screw-threaded into the threaded flange of said outer casing to clamp said flange against said shoulder, said inner casing also having an outwardly extending flange at its lower edge, a spacing device arranged about the exterior of said inner casing and comprising rings adapted to engage the respective flanges on said inner casing, and members to connect said rings one to the other, the lower ring extending laterally beyond the adjacent flange of said inner casing.

In testimony whereof, I affix my signature hereto.

SAMUEL B. HARNER.

Copies of this patent may be obtained for five cents each, by addressing the "Commissioner of Patents, Washington, D. C."